United States Patent
Sadowski (10) Patent No.: US 10,489,350 B2
(45) Date of Patent: Nov. 26, 2019

(54) DATA COMPRESSION WITH INLINE COMPRESSION METADATA

(71) Applicant: Advanced Micro Devices, Inc., Sunnyvale, CA (US)

(72) Inventor: Greg Sadowski, Boxborough, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 58 days.

(21) Appl. No.: 15/442,511

(22) Filed: Feb. 24, 2017

(65) Prior Publication Data

US 2018/0246657 A1    Aug. 30, 2018

(51) Int. Cl.
| | |
|---|---|
| G06F 16/174 | (2019.01) |
| G06F 3/06 | (2006.01) |
| H04L 29/06 | (2006.01) |
| H03M 7/30 | (2006.01) |
| H04L 9/32 | (2006.01) |

(52) U.S. Cl.
CPC ........ *G06F 16/1744* (2019.01); *G06F 3/064* (2013.01); *G06F 3/068* (2013.01); *G06F 3/0608* (2013.01); *H03M 7/30* (2013.01); *H03M 7/3077* (2013.01); *H03M 7/3079* (2013.01); *H04L 9/3247* (2013.01); *H04L 63/123* (2013.01); *H04L 63/126* (2013.01); *H04L 69/04* (2013.01); *G06F 2212/401* (2013.01); *H04L 2209/30* (2013.01)

(58) Field of Classification Search
CPC ........ G06F 3/0619; G06F 3/065; G06F 3/068; G06F 17/30153; G06F 2212/401; H03M 7/30; H04L 29/0604; H04N 19/00
See application file for complete search history.

(56) References Cited

U.S. PATENT DOCUMENTS

| | | | | |
|---|---|---|---|---|
| 8,497,788 | B1* | 7/2013 | Miller | H03M 7/30 341/51 |
| 2006/0184505 | A1* | 8/2006 | Kedem | G06F 3/0608 |
| 2007/0061546 | A1* | 3/2007 | Berger | G06F 16/2272 711/202 |
| 2007/0208893 | A1* | 9/2007 | Azzarello | G06F 17/30153 710/68 |
| 2008/0059728 | A1* | 3/2008 | Daly | G06F 12/08 711/158 |
| 2010/0250896 | A1* | 9/2010 | Matze | G06F 3/0608 711/216 |
| 2011/0080956 | A1* | 4/2011 | Zhou | H04N 19/61 375/240.24 |

(Continued)

*Primary Examiner* — Yaima Rigol
(74) *Attorney, Agent, or Firm* — Volpe and Koenig, P.C.

(57) ABSTRACT

Techniques for handling data compression in which metadata that indicates which portions of data are compressed are which portions of data are not compressed are disclosed. Segments of a buffer referred to as block groups store compressed blocks of data along with uncompressed blocks of data and hash blocks. If a block group includes a block that is a hash of another block in the block group, then the other block is considered to be compressed. If the block group does not include a block that is a hash of another block in the block group, then the blocks in the block group are uncompressed. The hash function to generate the hash is selected to prevent "collisions," which occur when the data being stored in the buffer is such that it is possible for a hash block and an uncompressed block to be the same.

14 Claims, 5 Drawing Sheets

(56) References Cited

U.S. PATENT DOCUMENTS

| | | | |
|---|---|---|---|
| 2015/0242309 A1* | 8/2015 | Talagala | G06F 12/0246 711/103 |
| 2016/0077960 A1* | 3/2016 | Hung | G06F 12/0246 711/103 |
| 2016/0077980 A1* | 3/2016 | Tomlin | G06F 17/30286 711/135 |
| 2017/0371593 A1* | 12/2017 | Li | G06F 3/0608 |

* cited by examiner

DATA COMPRESSION WITH INLINE COMPRESSION METADATA

STATEMENT REGARDING FEDERALLY SPONSORED RESEARCH OR DEVELOPMENT

This invention was made with Government support under FastForward-2 Node Architecture (NA) Project with Lawrence Livermore National Laboratory (Prime Contract No. DE-AC52-07NA27344, Subcontract No. B609201) awarded by DOE. The Government has certain rights in this invention.

TECHNICAL FIELD

The disclosed embodiments are generally directed to data processing, and in particular, to data compression with inline compression metadata.

BACKGROUND

Compression is used in many parts of a computer system. Uncompressed data consumes a certain amount of storage or bandwidth for transmission. Compression reduces the size of the data so that storage or bandwidth requirements for the data or both are reduced. Compression technology is constantly being improved.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to techniques for handling data compression in which metadata that indicates which portions of data are compressed and which portions of data are not compressed. Compressed blocks of data are stored in a buffer in memory along with uncompressed blocks of data. In addition, the buffer stores hash blocks that indicate whether other blocks in the buffer are compressed. The blocks of data and the hash blocks are stored in segments referred to as "block groups." If a block group includes a block that is a hash of another block in the block group, then the other block is considered to be compressed. If the block group does not include a block that is a hash of another block in the block group, then the blocks in the block group are uncompressed. The hash function to generate the hash is selected to prevent "collisions," which occur when the data being stored in the buffer is such that it is possible for a hash block and an uncompressed block to be the same. Hash functions are chosen for particular data types, with the idea that for that data type, using the hash function, no uncompressed data mimics or simulates the hash value.

Figure 1:
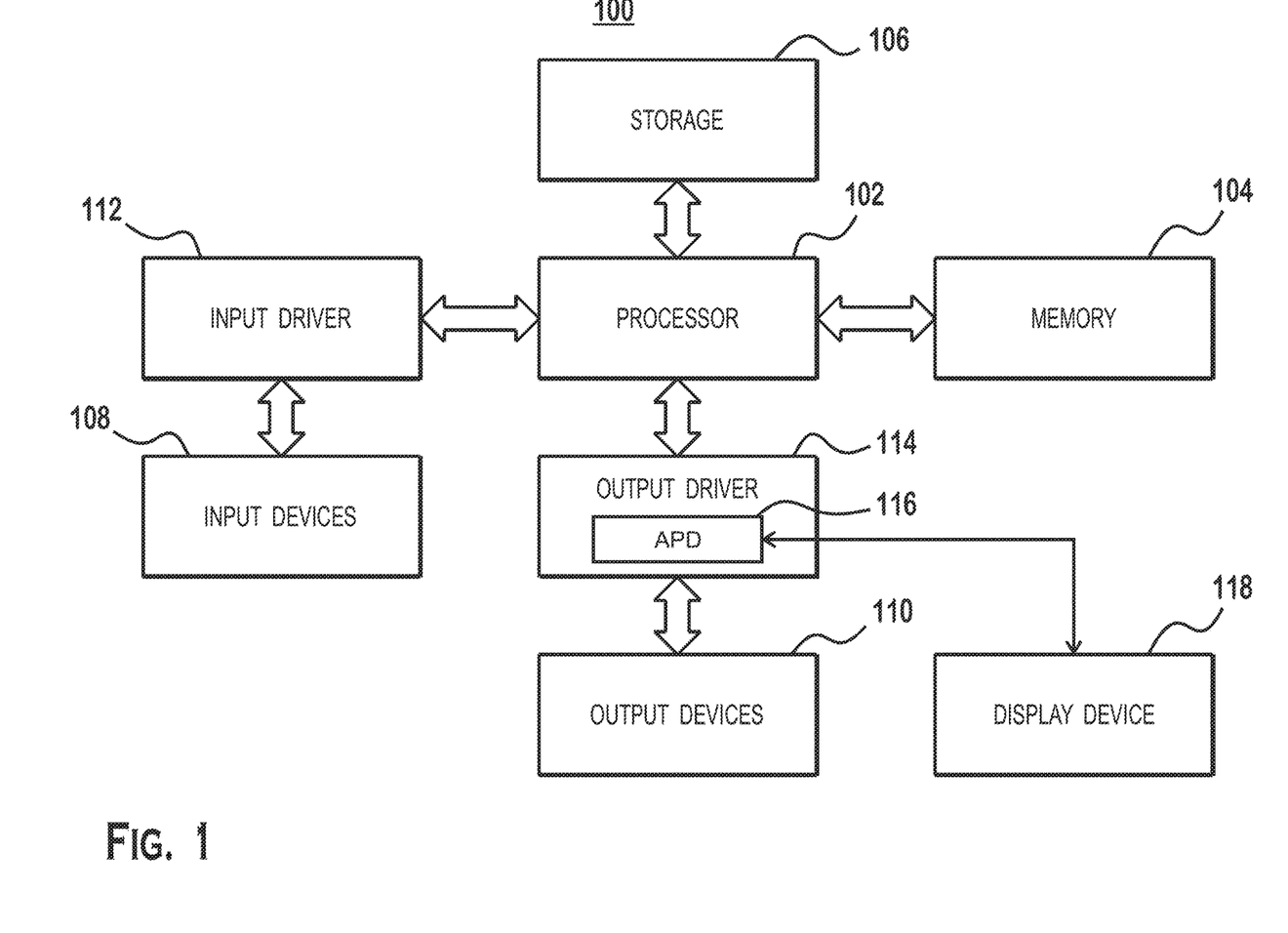
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

Although a specific number of the elements listed above (e.g., processor 102, memory 104, or the like) are illustrated in FIG. 1, it should be understood that the teachings provided herein apply for implementations of the device 100 that include more or less than the specific number of elements illustrated. For example, there may be two or more processors 102, two or more memories 104, or the like).

Various components within the device 100 and various components external to the device 100 communicate with components within the device 100. Some such communications are performed with compressed data, in which at least some of the data—the compressed data—is represented in fewer bits than uncompressed data. In various implementations, this type of communication occurs in many different ways for many different purposes. In one example, compressed video is stored in a buffer. A video read-out unit (e.g., in output driver 114) reads the compressed video, decompresses that video, and outputs the data to a screen for display by a user. In another example, data is stored in general purpose memory in a compressed fashion. A unit requests reading of that data and in response, a decompression unit decompresses the data and transmits the data to the requesting unit. In yet another example, the device 100 includes two or more processors 102 that communicate. Part of this communication involves storing data in a compressed manner, transmitting the compressed data to the receiver, and uncompressing the data at the receiver. One use for such compression is to increase bus bandwidth used by a processor 102 by facilitating transmission of data in compressed form. For example, if data is compressed in a 2:1 ratio, then twice the amount of data can be transmitted over the same bus as compared with uncompressed data.

In some examples, communication with compressed data involves a scheme in which one component stores a "full-buffer representation" of compressed data and another component reads or writes that full-buffer representation using an in-transit, non-full-buffer representation of the data. A full-buffer representation is a representation of a collection of compressed data and uncompressed data in which, despite compression being applied to one or more portions of the data, the buffer in which the compressed data is stored is sized large enough to hold the data if all of that data were uncompressed. Thus, a buffer storing a full-buffer representation of compressed data typically includes "empty" space, or space that does not include compressed or uncompressed data.

An in-transit representation of the data is a representation that is transmitted in a way such that the amount of data transmitted is associated with the total of uncompressed and compressed data. In such a representation, the data found in the "empty" space in the full-buffer representation is not transmitted along with the compressed or uncompressed data. Thus, the in-transit representation consumes less bandwidth during transmission than would be needed if all the data in the full-buffer representation were uncompressed and were transmitted. In other words, the amount of data transmitted in the in-transit representation is less than the size of the buffer storing the full-buffer representation.

The full-buffer/in-transit representation paradigm is used in a large number of applications. One application is storing graphical data for output to a screen or for processing (such as image processing or the like). A buffer sized large enough to store all uncompressed data is allocated and, as the data stored in the buffer is modified, the blocks of data that are compressed are also modified. This activity leaves "holes" in the buffer than move around depending on which blocks are compressed and which are uncompressed.

Figure 2:
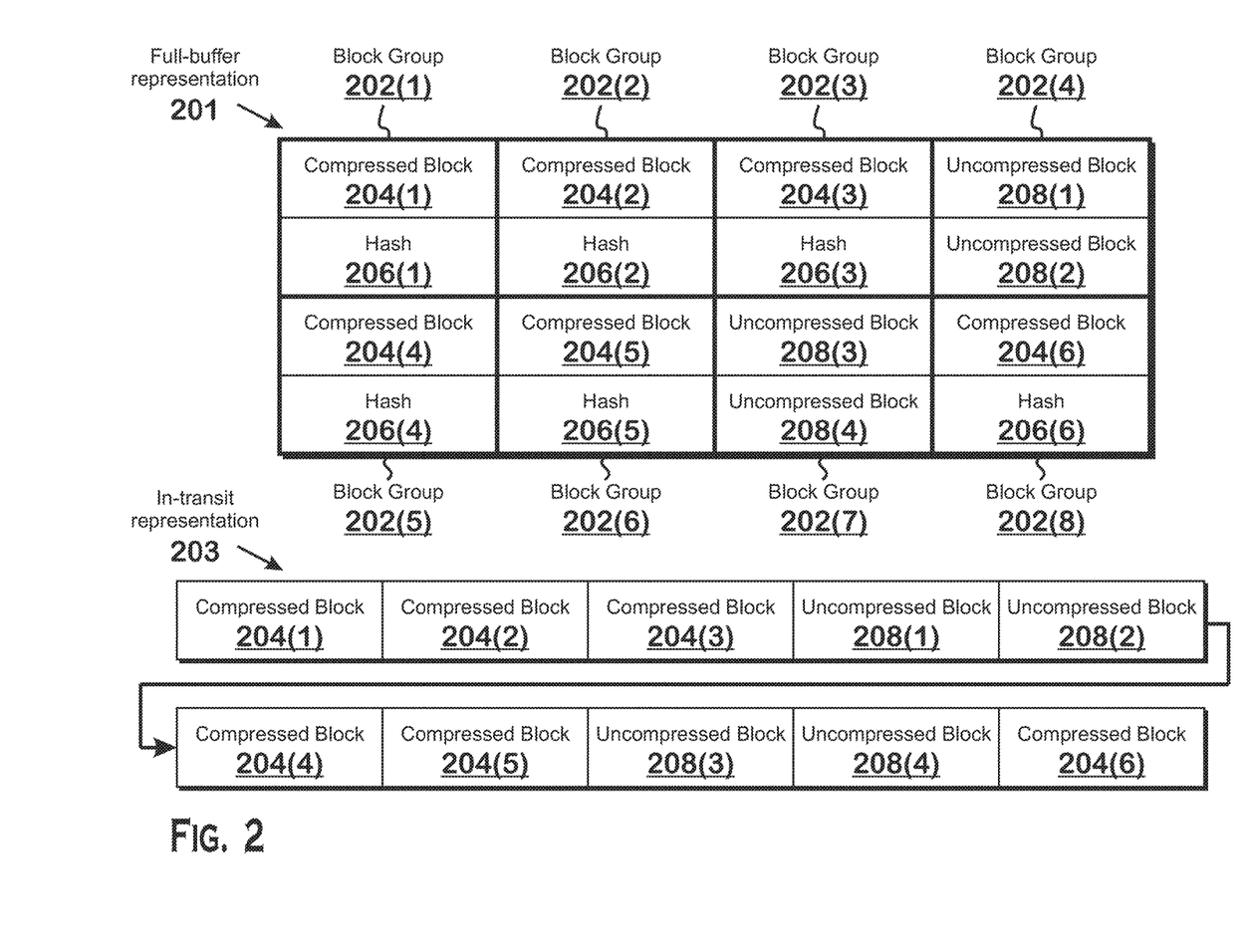
FIG. 2 illustrates compressed data in a full-buffer representation of compressed data and in an in-transit representation of compressed data, according to an example.

FIG. 2 illustrates compressed data in a full-buffer representation 201 of compressed data and in an in-transit representation 203 of compressed data, according to an example. The full-buffer representation 201 includes compressed and uncompressed data, as well as "hashes," which are a form of metadata that helps indicate what data is compressed and what data is uncompressed. The in-transit representation 203 includes compressed and uncompressed data but does not include the hashes. Thus, the in-transit representation 203 includes less data than the full-buffer representation 201. Conceptually, the full-buffer representation 201 represents partially compressed data that can be read by an entity without requiring transmission of all data in an uncompressed format. Thus although the full-buffer representation 201, which is partially compressed, consumes an amount of memory that is the same as the amount needed for uncompressed data, compressed data of the full-buffer representation 201 is transmitted using less than that amount of data.

In greater detail, the full-buffer representation 201 includes compressed blocks 204 and uncompressed blocks 208. "Blocks" are portions of data that occupy the same amount of space in memory. The compressed blocks 204 include compressed data and the uncompressed blocks 208 include uncompressed data. The full-buffer representation 201 is divided into block groups 202. Within any particular block group 202, data is either compressed or uncompressed. For block groups 202 with uncompressed data, all data in in that block group 202 is uncompressed. In FIG. 2, the memory order of the block groups 202 is from left to right and then top to bottom. Within the block groups 202, the memory order is from top to bottom.

Block groups 202 with compressed data include no uncompressed blocks 208 and include at least one compressed block 204 and at least one hash block 206. In some situations, block groups 202 also include empty blocks (not shown in FIG. 2). Such situations include compression schemes in which data is compressed to a greater degree than 2:1. For example, in a 4:1 compression scheme, one block would include compressed data, one block would include hash data, and two blocks would be empty.

Hash blocks 206 include data indicating whether the block immediately prior to the hash block 206 is compressed or uncompressed. More specifically, for any given block, if the immediately subsequent block is a hash of the given block, then the given block is considered to be compressed and if the immediately subsequent block is not a hash of the given block, then the given block is considered to be uncompressed.

Any practical hash function can be used to generate a hash block. Both the unit that generates the hash block and the unit that checks the hash to determine whether the immediately prior block is compressed (if those units are different) are in agreement as to what hash function is to be used.

Without the hash blocks 206, some other mechanism would be needed in order to indicate which blocks are compressed and which blocks are uncompressed. Without some mechanism for making such indication, a unit using the data would not be able to differentiate between compressed or uncompressed blocks and thus would be unable to decompress the compressed blocks while leaving the uncompressed blocks as-is. One possible mechanism is to store metadata indicating whether blocks are compressed or uncompressed separately from a full-buffer representation of the data. Though simple, this mechanism has issues such as a requirement to create and manage a separate metadata buffer that is in a separate part of memory as compared with the buffer that stores the compressed and uncompressed data. The hash block mechanism allows the compression metadata to be stored in the full-buffer representation 201, which removes the need for a separate buffer that is managed separately from the full-buffer representation 201. More specifically, the hash blocks 206 are stored "in line" with the compressed blocks 204 and the uncompressed blocks 208, meaning that the hash blocks 206 are found in between compressed blocks and/or uncompressed blocks, rather than being stored external the buffer that stores the compressed blocks 204 and the uncompressed blocks 208.

The hash function that is used to generate the hash blocks 206 is preferably one that does not cause "collisions" with uncompressed data. A "collision" occurs when data in an uncompressed block 208 happens to be a hash of the data in the immediately prior uncompressed block 208. In this situation, the unit interpreting the first uncompressed block 208 would interpret that block as a compressed block, leading to incorrect results. Using a hash function that prevents hashes of uncompressed data from being the same as any possible uncompressed data therefore prevents collisions.

The hash function that is used can be selected based on the type of the data that is compressed. In various implementations, the hardware that compresses and decompresses data chooses the hash function, an application that generates and/or uses the data chooses the hash function, or any other entity chooses the hash function.

Figure 3:
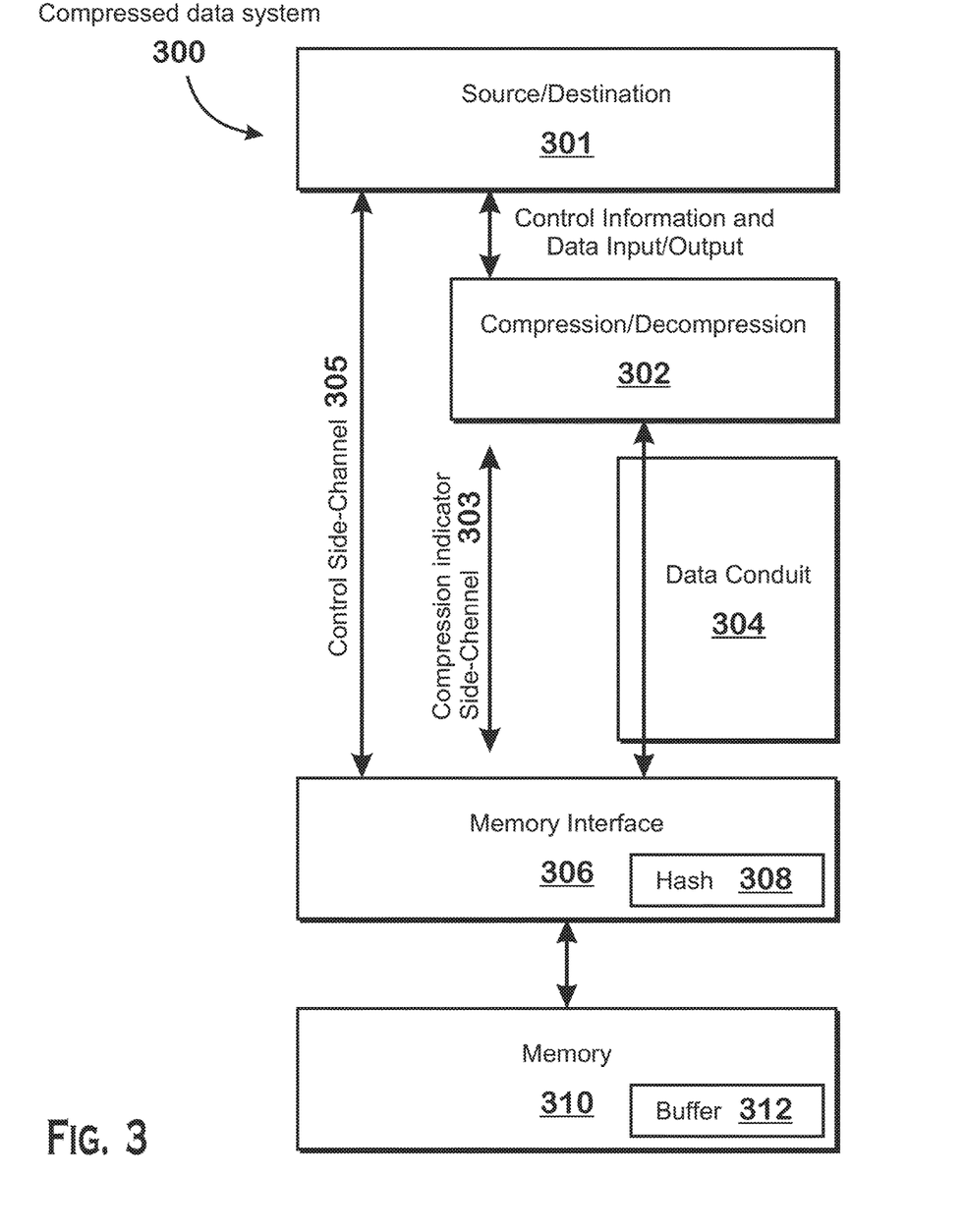
FIG. 3 is a block diagram of a compressed data system, according to an example.

FIG. 3 is a block diagram of a compressed data system 300, according to an example. The compressed data system 300 includes a source/destination 301 that is configured to read data from or write data to a memory 310 via a data conduit 304. The memory 310 stores compressed data in a buffer 312. In some implementations, the buffer 312 is sized large enough to fit a particular set of data even if all of that data were uncompressed. That allocated space remains allocated even if some of the data becomes or is compressed.

The source/destination 301 is any unit within the device 100 or external to the device that is configured to read or write compressed data into the buffer 312. The compression/decompression unit 302 is a hardware or software module that is configured to compress or decompress data for storage in the buffer 312. The compression/decompression unit 302 applies one or more of any technically feasible compression and decompression techniques. Those of skill in the art will understand that the particular compression/decompression technique used by the compression/decompression unit 302 may vary for different applications. The data conduit 304 is any unit that transfers data between the compression/decompression unit 302 and the memory interface 306. Some examples of such a unit include a bus, a network transmission line, or any other conduit. Typically, such units have a fixed data rate such as a number of bits per second. The compression indicator side-channel 303 is a communication channel in addition to the fixed data rate of the data conduit 304 that allows for transmission of compression indicators that indicate whether particular blocks are compressed. The memory interface 306 is configured to prepare the compressed data received from the source/destination 301 for storage in the buffer 312 or to prepare data from the buffer 312 for transmission to the source/destination 301.

Figure 4:
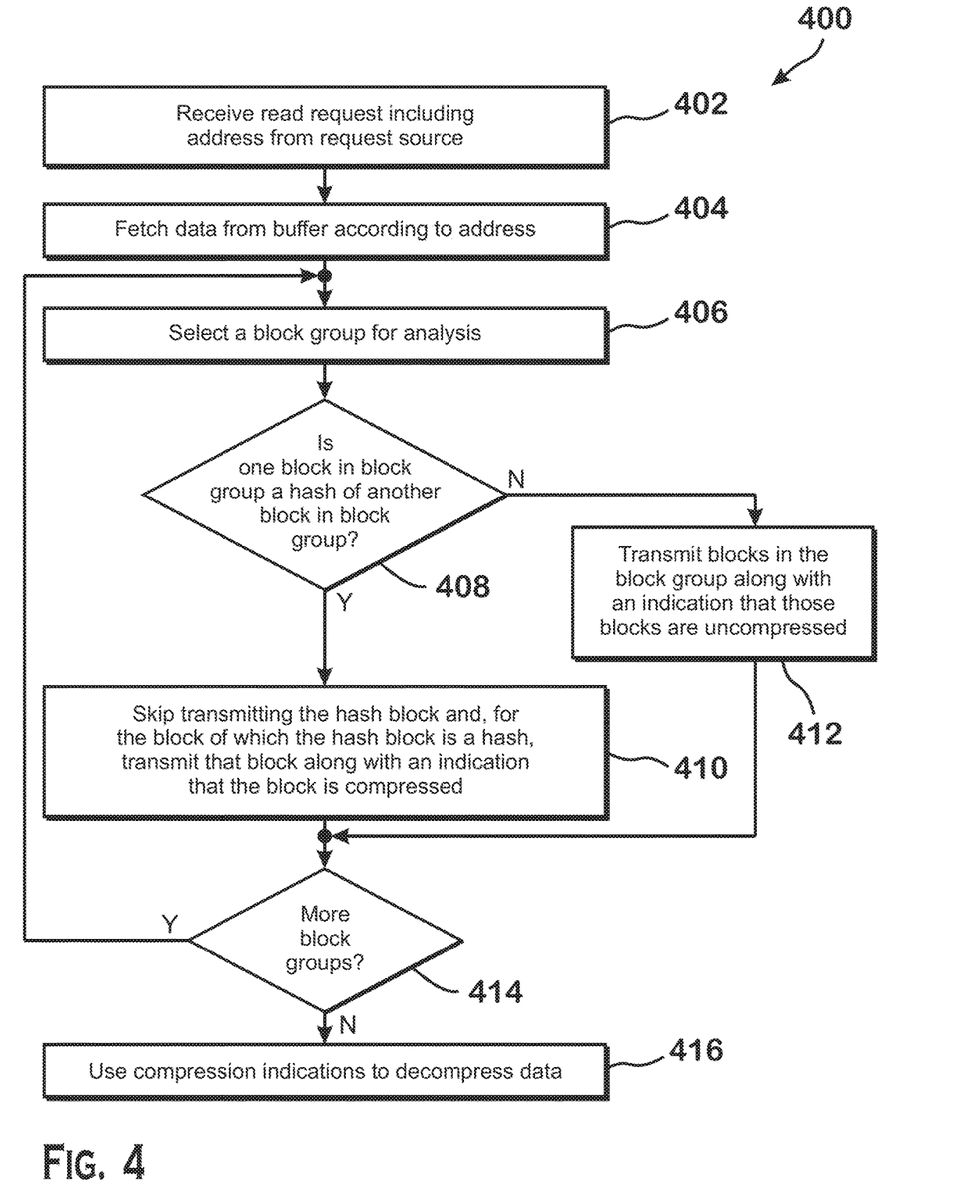
FIG. 4 is a flow diagram of a method for reading from a memory storing compressed data, according to an example.
Figure 5:
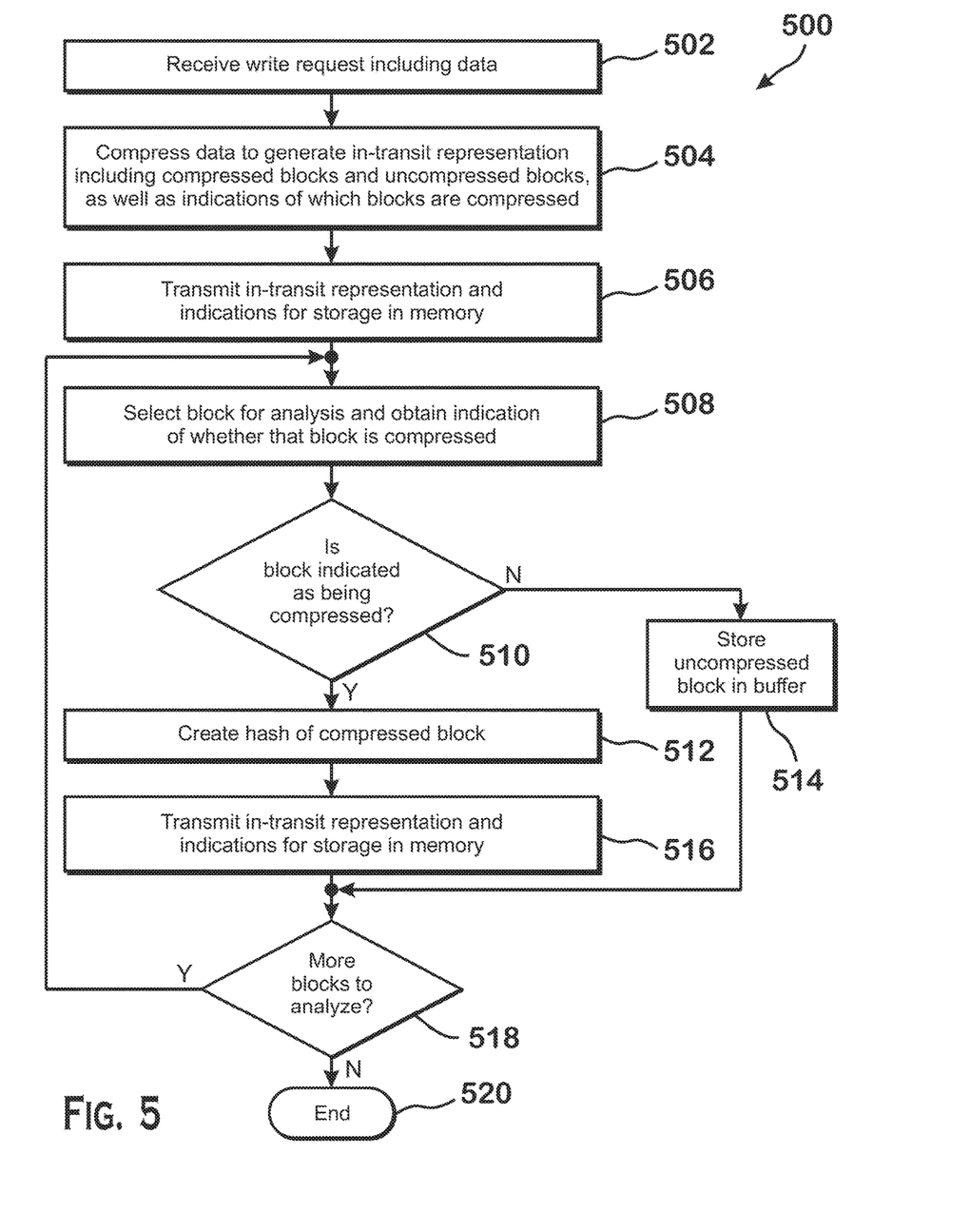
FIG. 5 is a flow diagram of a method for writing to a memory storing compressed data, according to an example.

Operations associated with reading and writing via the compressed data system 300 are now described with respect to FIGS. 4 and 5 in conjunction with FIG. 3. FIG. 4 is a flow diagram of a method 400 for reading from a memory storing compressed data, according to an example. Although described with respect to the system shown and described with respect to FIGS. 1-3, it should be understood that any system configured to perform the method, in any technically feasible order, falls within the scope of the present disclosure.

As shown, the method 400 begins at step 402, where the memory interface 306 receives a read request from the source/destination 301. The read request specifies an address. In response, the memory interface 306 fetches data at the address from the buffer 312 in the memory 310. At step 406, of this fetched data, the memory interface 306 selects a block group for analysis.

At step 408, the memory interface 306 determines whether one block in the selected block group is a hash of another block in the block group. More specifically, the hash unit 308 performs a hash on a block of the block group and determines whether that hash is the same as another block in the block group. If the hash is the same as another block in the block group, then the memory interface 306 determines that one block in the selected block group is a hash of another block in the block group. If no block of the block group is a hash of another block of the block group, then the method 400 proceeds to step 412 and if a block of the block group is a hash of another block in the block group, then the method proceeds to step 410.

At step 410, the memory interface 306 discards the hash block and transmits the compressed block over the data conduit 304 to the compression/decompression unit 302 along with an indication that the compressed block is compressed. After step 410, the method 400 proceeds to step 414.

Referring back to step 408, if one block in the block group is not a hash of another block in the block group, then the blocks in the block group are not compressed and the method 400 proceeds to step 412. At step 412, the memory interface 306 transmits the uncompressed data (and, optionally indications that this data is not compressed) to the compression/decompression unit 302 and the method proceeds to step 414. At step 414, the memory interface 306 determines whether there are more block groups to read. If there are block groups to read, then the method 400 returns to step 406 and if there are no block groups to read, then the method 400 proceeds to step 416, where the compression/decompression unit 302 uses the compression indications to decompress data for use by the source/destination 301. More specifically, the compression/decompression unit 302 decompresses blocks that are indicated to be compressed and does not decompress blocks that are indicated to be uncompressed. It will be understood by those of skill in the art that the compression/decompression unit 302 does not need to wait for all blocks to be received from the buffer 312 to begin decompressing compressed blocks for use by the source/destination 301.

FIG. 5 is a flow diagram of a method 500 for writing to a memory storing compressed data, according to an example. Although described with respect to the system shown and described with respect to FIGS. 1-3, it should be understood that any system configured to perform the method, in any technically feasible order, falls within the scope of the present disclosure.

As shown, the method 500 begins at step 502, where the memory interface 306 receives a write command from the source/destination 301 via the control side-channel 305 and the compression/decompression unit 302 receives data to be compressed and written to memory 310. At step 504, the compression/decompression unit 302 compresses at least some of the data, generating compressed and uncompressed blocks. The compression/decompression unit 302 also generates indications for each block that indicates which blocks are compressed. The generated compressed and uncompressed blocks together constitute an in-transit representation 203 of the data to be written.

At step 506, the compression/decompression unit 302 transmits the in-transit representation 203 of the data via the data conduit 304 to the memory interface 306 for storage in the memory 310, and also transmits the indications of whether the blocks are compressed to the memory interface 306 via the compression indicator side-channel 303. At step 508, the memory interface 306 selects a block for analysis and obtains the compression indicator for that block. At step 510, if the compression indicator indicates that the block is compressed, then the method 500 proceeds to step 510 and if the compression indicator indicates that the block is not compressed, then the method 500 proceeds to step 514. At step 514, the memory interface 306 stores the uncompressed block in the buffer 312 without hashing the block. After step 514, the method 500 proceeds to step 518.

Returning back to step 510, if the block is indicated as being compressed, then the method 500 proceeds to step 512. At step 512, the hash unit 308 creates a hash of the compressed block. At step 516, the memory 310 stores the hash of the compressed block as well as the compressed block in the buffer 312.

At step 518, the memory interface 306 determines whether there are more blocks to analyze. If there are more blocks to analyze, then the method 500 returns to step 508 and if there are no more blocks to analyze, then the method 500 proceeds to step 520, where the method 500 ends.

The memory accesses described with respect to FIG. 4 (read) and FIG. 5 (write) is described generically as follows. The source/destination 301 generates a memory access (either read or write) and transmits that memory access to the memory interface 306. The access specifies data to be read or written and an access type, such as "read" or "write." The specified data is specified by address and, if the access type is a write, then the data actual data is specified. The data that is specified includes a compressed block and an uncompressed block. More specifically, if the access is of type read, then the data at the specified address is the data in the buffer 312, which includes a compressed block and an uncompressed block. If the access is of type write, then the data specified is at least partially compressed by the compression/decompression unit 302 and thus includes a compressed block and an uncompressed block.

In response to receiving the access request at the memory interface 306, the hash unit 308 performs at least one hash operation for that data access. The hash operation is performed for data that is stored in (read) or that is to be stored in (write) the buffer 312 and is also associated with identifying the compressed block of the data as being compressed. For a read, the hash operation includes performing hashes on blocks in block groups to generate hash blocks and comparing the hash blocks to other blocks to determine whether those other blocks are compressed blocks or uncompressed blocks. For a write, the hash operation includes hashing compressed blocks and storing the compressed blocks along with the hash blocks in the buffer 312.

In various implementations, in either the read (FIG. 4) or the write (FIG. 5), one or more of the units in the compressed data system 300 checks for collisions. As described above, a collision occurs in the event that the hash of compressed data "looks like" uncompressed data. In the compressed data system 300 of FIG. 3, in one example, a collision occurs in the event that the memory interface 306 reads a block group and determines that a second block in the block group is a hash of the first block group (which would indicate that the first block is compressed), but the first block is actually uncompressed data. In various examples, this disparity is noticed by the compression/decompression unit 302, which determines that a block that is indicated to be compressed cannot be decompressed, or by the consumer of the data (e.g., software or hardware that eventually consumes the data, such as the source/destination 301), which performs a check on the data and determines that the data is invalid.

In response to determining that a collision has occurred, the unit that detected the collision can request a remedial measure be performed. In various examples, the remedial measure includes re-performing a set of operations involving the data but with a different hash function (e.g., re-writing the data, so that the uncompressed block does not look like a hash, and then re-reading the data at a later time in accordance with the operations of the consumer of the data), or with no compression.

The hash function is preferably selected so that collisions do not occur. In one example, the consumer is configured to specify a particular hash function to the memory interface 306 prior to performing operations that utilize compressed data. In such situations, the consumer would know that data used by the consumer would not cause collisions while using the specified hash function. In another example, the consumer provides test data to the compressed data system 300, which varies the hash function until collisions do not occur. In yet another example, the compressed data system 300 uses a hash function determined to cause collisions with relatively few types of data.

It should be understood that many variations are possible based on the disclosure herein. In one example variation, non-hash signature functions are used instead of hash functions. More specifically, although it is described herein that a hash function is used to identify blocks as compressed blocks, other non-hash functions could be alternatively utilized. Functions used to generate a value that identifies a particular block as being compressed are referred to generically herein as "signature functions," and the resultant value generated by signature functions are referred to herein generically as "signatures" or "signature blocks." Thus, in the discussion above, where it is stated that hash functions are used to generate hash blocks from compressed blocks and that a hash function is applied to a block in a block group to obtain a hash result which is then compared to a different block in the block group, it could instead be stated that signature functions are used to generate signature blocks from compressed blocks and that the signature function is applied to a block in a block group to obtain a signature which is then compared to a different block in the block group to determine whether the first block is compressed. As described above, any hash function could be used as a signature function—the term "signature function" applies generically to both hash functions and to non-hash signature functions. Some example signature functions include a duplication, where a signature of a particular block is identical to the block, an inverse duplication, where a signature of a particular block is the bitwise inverse of the block (i.e., all bits of the block are inverted, 0 to 1 and 1 to 0), a combination of a duplication and an inverted duplication, where one or more portions of block are identical and one or more other portions are bitwise inverses of the block, or a checksum function of the block, where the checksum can be one of the following: odd or even parity, a modular sum (where all words of the block are added as an unsigned binary number), a position dependent checksum such as a cyclic redundancy check, or a modulo value of the block. A signature can be any length from one bit up to the size of the space allocated for the signature block (which can be the same amount of space allocated for a compressed block). The above list of example signature functions is not exhaustive and any other technically feasible signature function could be used instead.

Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accessing compressed data, the method comprising:
receiving an access request at a memory interface, the access request specifying data and an access type, the data including a block group stored in a buffer that stores a plurality of block groups that are each the same size, each block also being the same size, the access request received from a data consumer;
responsive to the access request, performing a signature operation for a block of the block group, the signature operation identifying the block as being either compressed or uncompressed, based on whether the block group includes a block that is a signature of another block in the block group;
transmitting all blocks of the block group to the data consumer if the signature operation identifies the block as uncompressed, and
transmitting only compressed blocks of the block group if the signature operation identifies the block as compressed,
wherein the block groups of the buffer include either all uncompressed blocks or one compressed block and one signature block comprising a signature of the one compressed block.

2. The method of claim 1, wherein:
the access request comprises a read request.

3. The method of claim 2, further comprising:
responsive to the read request, fetching read data from the buffer, the read data including the compressed block and the signature block.

4. The method of claim 3, wherein the signature operation comprises:
performing a signature function on the compressed block to obtain a signature of the compressed block;
determining that the signature block matches the signature of the compressed block; and
discarding the signature block in response to determining that the signature block matches the signature of the compressed block.

5. The method of claim 4, further comprising:
transmitting the compressed block and the uncompressed block to a compression/decompression unit, with an indication that the compressed block is compressed;
based on the indication, decompressing the compressed block to generate a decompressed block; and
transmitting the decompressed block and the uncompressed block to the data consumer.

6. The method of claim 1, wherein the signature operation comprises one of:
a hash function, a duplication function, a bitwise inverse duplication function, a parity function, a checksum function, a modular sum function, or a modulo function.

7. A memory system comprising:
a memory; and
a memory interface configured to:
receive an access request specifying data and an access type, the data including a block group stored in a buffer that stores a plurality of block groups that are each the same size, each block also being the same size, the access request received from a data consumer;
responsive to the access request, perform a signature operation for a block of the block group, the signature operation identifying the block as being either compressed or uncompressed;
transmit all blocks of the block group to the data consumer if the signature operation identifies the block as uncompressed, and
transmit only compressed blocks of the block group if the signature operation identifies the block as compressed,
wherein the block groups of the buffer include either all uncompressed blocks or one compressed block and one signature block comprising a signature of the one compressed block.

8. The memory system of claim 7, wherein:
the access request comprises a read request.

9. The memory system of claim 8, wherein the memory interface is further configured to:
responsive to the read request, fetch read data from the buffer, the read data including the compressed block and the signature block.

10. The memory system of claim 9, wherein the memory interface is configured to perform the signature operation by:
performing a signature function on the compressed block to generate a signature of the compressed block;
determining that the signature block matches the signature of the compressed block; and
discarding the signature block in response to determining that the signature block matches the signature of the compressed block.

11. The memory system of claim 10, wherein:
the memory system further comprises a compression/decompression block
the memory interface is further configured to transmit the compressed block and the uncompressed block to the compression/decompression unit, with an indication that the compressed block is compressed; and
the compression/decompression block is configured to:
based on the indication, decompress the compressed block to generate a decompressed block, and
transmit the decompressed block and the uncompressed block to the data consumer.

12. The memory system of claim 7, wherein the signature operation comprises one of:
a hash function, a duplication function, a bitwise inverse duplication function, a parity function, a checksum function, a modular sum function, or a modulo function.

13. A computer system comprising:
a data processor;
a compression/decompression unit coupled to the data processor;
a memory interface coupled to the compression/decompression unit via a data conduit and a compression indicator side-channel and to the data processor via a control side-channel; and
a memory coupled to the memory interface,
wherein the memory interface is configured to:
receive an access request specifying data and an access type, the data including a block group stored in a buffer that stores a plurality of block groups that are each the same size, each block also being the same size, the access request received from a data consumer;
responsive to the access request, perform a signature operation for a block of the block group, the signature operation identifying the block as being either compressed or uncompressed;
transmit all blocks of the block group to the data consumer if the signature operation identifies the block as uncompressed, and
transmit only compressed blocks of the block group if the signature operation identifies the block as compressed,
wherein the block groups of the buffer include either all uncompressed blocks or one compressed block and one signature block comprising a signature of the one compressed block.

14. The computer system of claim 13, wherein the signature operation comprises one of:
a hash function, a duplication function, a bitwise inverse duplication function, a parity function, a checksum function, a modular sum function, or a modulo function.

* * * * *